(12) United States Patent
Schneider et al.

(10) Patent No.: US 10,711,913 B2
(45) Date of Patent: Jul. 14, 2020

(54) METHOD FOR ACTIVATING AN ELECTROMAGNETIC VALVE

(71) Applicant: Andreas Stihl AG & Co. KG, Waiblingen (DE)

(72) Inventors: Michael Schneider, Fellbach (DE); Felix Mayer, Waiblingen (DE); Tobias Deigendesch, Backnang (DE); Sebastian Hanussek, Remseck (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 21 days.

(21) Appl. No.: 16/005,494

(22) Filed: Jun. 11, 2018

(65) Prior Publication Data

US 2018/0355995 A1 Dec. 13, 2018

(30) Foreign Application Priority Data

Jun. 9, 2017 (EP) ..................................... 17400038

(51) Int. Cl.
*F16K 31/06* (2006.01)
*B24B 55/02* (2006.01)

(52) U.S. Cl.
CPC .......... *F16K 31/0675* (2013.01); *B24B 55/02* (2013.01)

(58) Field of Classification Search
USPC .................................................... 251/129.04
See application file for complete search history.

(56) References Cited

U.S. PATENT DOCUMENTS

| 4,361,164 | A | * | 11/1982 | Sakakibara | ............. | F02D 41/20 137/14 |
| 4,726,389 | A | * | 2/1988 | Minoura | ............. | F02D 41/2096 137/1 |
| 5,938,172 | A | * | 8/1999 | Ohtsuka | ................ | H01F 7/1844 251/129.01 |
| 6,056,000 | A | * | 5/2000 | Santacatterina | .... | F16K 31/0675 137/1 |
| 6,493,204 | B1 | * | 12/2002 | Glidden | .................... | B60T 8/36 361/154 |
| 7,126,449 | B2 | | 10/2006 | Nickel et al. | | |
| 7,713,111 | B2 | | 5/2010 | Layher et al. | | |
| 8,382,448 | B2 | | 2/2013 | Fries et al. | | |
| 10,240,785 | B2 | * | 3/2019 | Konishi | .................. | F23K 5/147 |
| 2008/0105789 | A1 | | 5/2008 | Smith et al. | | |

(Continued)

FOREIGN PATENT DOCUMENTS

DE 102005024173 A1 11/2006

*Primary Examiner* — Umashankar Venkatesan
(74) *Attorney, Agent, or Firm* — Walter Ottesen, P.A.

(57) ABSTRACT

A method is for activating an electromagnetic valve including a valve seat and a valve body. The valve body is movable between a first and the second position (A, B) via an electric drive coil. The drive coil is connected to a control device which as a function of a setting variable (S) energizes the drive coil with a signal sequence consisting of control signals in order to move the valve body. The control device as a function of the setting variable (S) sets a predetermined signal amplitude and/or a predetermined signal duration of the control signals. It is provided that at least one control signal of the signal sequence is formed with an amplitude superelevated above the predetermined signal amplitude and/or with a signal duration extended beyond the predetermined signal duration.

18 Claims, 5 Drawing Sheets

(56) References Cited

U.S. PATENT DOCUMENTS

2008/0212252 A1* 9/2008 Kamata ............... F16K 31/0651
                                                    361/154
2009/0289494 A1* 11/2009 Landesfeind ............. B60T 8/36
                                                    303/119.2
2018/0321695 A1* 11/2018 Gardt ........................ B60T 8/36

* cited by examiner

METHOD FOR ACTIVATING AN ELECTROMAGNETIC VALVE

CROSS REFERENCE TO RELATED APPLICATION

This application claims priority of European patent application no. 17 400 038.0, filed Jun. 9, 2017, the entire content of which is incorporated herein by reference.

FIELD OF THE INVENTION

The invention relates to a method for activating an electromagnetic valve including a valve seat and a valve body. The valve body is movable between a first position and a second position, for which purpose an electromechanical drive with an electric drive coil is provided. The electric drive coil is activated by a control device which as a function of a setting variable activates the drive coil of the electromagnetic valve with a signal sequence. The signal sequence output by the control device has a predetermined frequency and/or control signals with a signal amplitude predetermined by the control device and/or a signal duration predetermined by the control device.

BACKGROUND OF THE INVENTION

U.S. Pat. No. 7,713,111 discloses a control device for a water valve of a cut-off machine, which control device, during operation of a work tool, supplies a quantity of water, predetermined by the user, to the work tool. For this purpose, the work apparatus is connected with a water hose to a water supply, wherein the quantity of water supplied by the user is predetermined by an electronic setting unit. The signal of the setting unit is transmitted to a control device which as a function of the setting variable of the setting unit activates the drive coil of the electromagnetic valve with a pulse-width-modulated signal sequence. The quantity of water supplied by the electromagnetic valve can be set independently of the pressure of the water supply in such a manner that good dust binding at the cutting disk is ensured by the supplied quantity of water.

U.S. Pat. No. 7,126,449 discloses an electromagnetic valve for a fuel system, which valve, for the metering of a required quantity of fuel for a combustion engine, is acted upon by a control device with a pulse-width-modulated signal sequence. The pulse width of the operating pulses is determined by the control device as a function of operating parameters of the combustion engine and adapted over the operating duration of the combustion engine.

Irrespective of the use of an electromagnetic valve as a water valve, as a fuel valve or similar valve, the valve body of the valve may stick to the valve seat, may become jammed or may become sluggish in some other way. If an electromagnetic valve for setting a small volumetric flow is activated with only short operating pulses, a movement of the valve body may fail because of sticking, jamming or a similar obstruction. The valve body does not carry out any movement; the valve state remains unchanged despite energizing of the drive coil. It may thus happen that the valve does not open.

SUMMARY OF THE INVENTION

It is an object of the invention to provide a method for activating an electromagnetic valve, with which a valve body movement corresponding to the supplied control signal is reliably ensured.

The object can, for example, be achieved via a method for activating an electromagnetic valve, the electromagnetic valve including a valve seat and a valve body; the valve body being in a closed position in a first position (A) and in an open position in a second position (B); the electromagnetic valve further including an electric drive coil for the electromechanical driving of the valve body between the first position (A) and the second position (B); an electric control device connected to the drive coil of the electromagnetic valve, wherein the control device as a function of a setting variable (S) energizes the drive coil with a signal sequence of operating pulses in order to move the valve body between the first position (A) and the second position (B); the control device as a function of the setting variable (S) being configured to determine at least one predetermined signal amplitude for the operating pulses of the signal sequence, a predetermined signal duration for the operating pulses of the signal sequence, and a predetermined frequency for the operating pulses of the signal sequence; the method comprising the step of: supplying an initial signal sequence including a start pulse and operating pulses to electromechanically drive the valve body for a first activation of the electromagnetic valve, wherein the start pulse is formed with at least one of a signal amplitude superelevated above the predetermined signal amplitude of the operating pulse, a signal duration extended beyond the predetermined signal duration of the operating pulse, and a frequency increased over a predetermined frequency of the operating pulses of the signal sequence.

In the event of a first activation of the electromagnetic valve, a differentiation is made between "starting" of the valve and "operation" of the valve. After a rest period, the electromagnetic valve is first of all functionally activated, that is, one or more start pulses are fed in order initially to move a possibly sluggish valve body. After start pulses, it is assumed that the valve body is mechanically free and also reacts to operating pulses, and therefore the valve can be put into operation. The general term "control signals" includes the start pulses for ensuring the mechanical movability of the valve body and the operating pulses for the operation of the valve as intended.

The signal sequence consisting of control signals, which is supplied to the electromagnetic valve, is superelevated in the frequency, the signal amplitude and/or the signal duration irrespective of the values predetermined by the control device. This means that at least one control signal of the signal sequence is formed with a signal amplitude superelevated above the predetermined signal amplitude and/or with a signal duration extended beyond the predetermined signal duration and/or with a signal sequence frequency increased over a predetermined frequency. The effect which can thereby be achieved is that the drive coil of the electromagnetic valve is energized with a greater or longer lasting current, as a result of which a greater electromagnetic force is exerted on the valve body. The greater electromagnetic force ensures that the valve body is reliably moved despite jamming or sticking. The functioning capability of the valve is ensured. There is no feedback as to whether the valve body has or has not moved.

It can thus advantageously be provided to form a control signal with a 30% to 80% superelevated signal amplitude. The superelevated signal amplitude is greater than the signal amplitude, which is predetermined by the control device, of the control signal provided for operation of the valve.

In an advantageous embodiment of the invention, the control signal is a voltage, wherein the predetermined signal amplitude of the control signal has a first predetermined voltage and the superelevated signal amplitude is formed with a second superelevated voltage. The second superelevated voltage can be in particular up to 80% greater than the first predetermined voltage.

Alternatively or additionally, it can be provided to form the predetermined signal duration of the control signal with a 5% to 50% longer signal duration than the predetermined signal duration. The extended signal duration is expediently 20% longer than the signal duration predetermined by the control device for operation of the valve. As a result, a longer action of the electromagnetic setting force on the valve body can be ensured, which is sufficient in most cases in order initially to move a jammed or stuck valve body.

If, for example, a first control signal is selected to be significantly greater in its superelevated signal amplitude than the predetermined signal amplitude and, furthermore, the control signal is formed with a longer signal duration than the predetermined signal duration of the control signal, even in stubborn cases an initial release of a jammed or stuck valve body, and therefore the function of the electromagnetic valve, can be ensured.

In an embodiment of the invention, the electromagnetic valve is activated with a plurality of consecutive control signals which form the signal sequence. The signal sequence predetermined by the control device is expediently a pulse-width-modulated signal sequence in order to set the volumetric flow through the electromagnetic valve as a function of the pulse width which is set.

The signal sequence predetermined by the control device for the first activation of the electromagnetic valve advantageously includes start pulses and operating pulses. The signals of the signal sequence that are intended to ensure the initial movement of the valve element are referred to as start pulses. Operating pulses are the signals of the signal sequence that, during operation of the electromagnetic valve as intended, determine in particular the opening times and closing times thereof. A signal sequence therefore includes start pulses and operating pulses. The start pulses here have a signal amplitude superelevated above the predetermined signal amplitude of the operating pulse and/or a signal duration extended beyond the predetermined signal duration of the operating pulse and/or a frequency increased over a predetermined frequency of the operating pulses. For a reliable release of the valve element, a start pulse is provided as the first signal of the signal sequence. In particular, a plurality of consecutive start pulses can be provided at the beginning of a signal sequence. There are expediently up to ten start pulses. The start pulses which are consecutive in a short sequence in particular have a higher frequency, for example, a 0.5 to 5 times higher frequency than the operating pulses.

The start pulses are fed to the drive coil irrespective of an actual sluggishness of the valve body. There is also no feedback as to whether the valve body is or is not moving upon a start pulse. It has been shown in practice that a start pulse sent prior to sending operating pulses increases the functional reliability of the valve. Thus, upon each first activation of the valve, start pulses can be sent in order only then to feed in operating pulses for the regular operation of the valve. A first activation is understood as meaning a first starting up of the valve after a rest period without operating pulses. The first activation of the valve is also understood as meaning a change in the sequence or size of the operating pulses in order to change the volumetric flow controlled by the valve.

The method according to the invention is advantageously usable in particular in the case of a water valve, which is configured as an electromagnetic valve, on a cut-off machine.

The method is concretely usable on an electromagnetic valve as a water valve in a water supply of a work apparatus with a work tool. The electromagnetic water valve has an inflow and an outflow, a valve seat with a valve body being arranged between the inflow and the outflow. The valve body in a first position blocks the flow connection between the inflow and the outflow. In a second position, the valve body opens up the flow connection between the inflow and the outflow. The water valve is activated by a control device with a signal sequence consisting of control signals, which opens and closes the electromagnetic water valve, in particular using a pulse-width-modulated signal sequence. The opening times and/or the closing times of the water valve are able to be changed by the user via a setting unit connected to the control device. In accordance with the setting variable set by the user at the setting unit, the volumetric flow flowing through the water valve is set by the control device, for which purpose the water valve for moving the valve body is acted upon with a signal sequence consisting of control signals of predetermined signal amplitude. In order to ensure the movement of the valve body, it is provided that the control device as a function of a setting variable of the setting unit determines at least one predetermined signal amplitude and/or a predetermined signal duration for the control signals of the signal sequence, at least one control signal of the signal sequence being formed with a signal amplitude superelevated above the predetermined signal amplitude and/or with a signal duration extended beyond the predetermined signal duration and/or being formed with a frequency increased over a predetermined frequency of the signal sequence.

In a further embodiment of the invention, the method is usable in the case of an electromagnetic valve as a fuel valve in a fuel system of a combustion engine of a work apparatus. The electromagnetic fuel valve has an inflow and an outflow, a valve seat with a valve body being arranged between the inflow and the outflow. In a first position of the valve body, the flow connection between the inflow and the outflow is blocked. In a second position of the valve body, the flow connection between the inflow and the outflow is opened up. The fuel valve is activated by a control device with a signal sequence consisting of control signals which open and close the electric fuel valve. The opening times and/or the closing times of the fuel valve are determined via the control device which processes operating variables, such as, for example, the current load or a temperature of the combustion engine, and sets the volumetric flow through the fuel valve in such a manner that the combustion engine receives the quantity of fuel necessary for operation. For this purpose, the electromagnetic fuel valve for moving the valve body is acted upon with a signal sequence consisting of control signals of predetermined signal amplitude, the signal sequence being configured in particular as a pulse-width-modulated signal sequence. The control device will determine at least one predetermined signal amplitude and/or a predetermined signal duration for the control signals of the signal sequence as a function of at least one operating variable of the combustion engine. In order to ensure that the valve body of the electromagnetic fuel valve is reliably moved even if the valve body slightly jams or is stuck to the valve seat, at least one control signal of the signal sequence is formed with a signal amplitude superelevated above the predetermined signal amplitude and/or with a signal duration extended beyond the predetermined signal duration and/or with a frequency increased over a predetermined frequency of the signal sequence.

Further advantageous embodiments emerge from any desired combination of the features of the embodiments mentioned and described.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
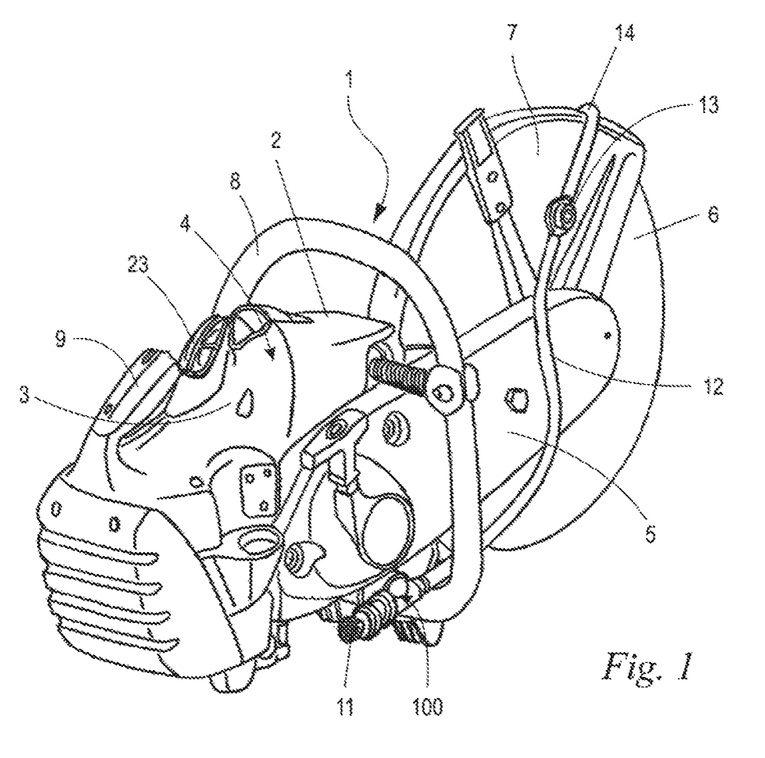
FIG. 1 shows, in a schematic illustration, a work apparatus using the example of a cut-off machine.
Figure 8:
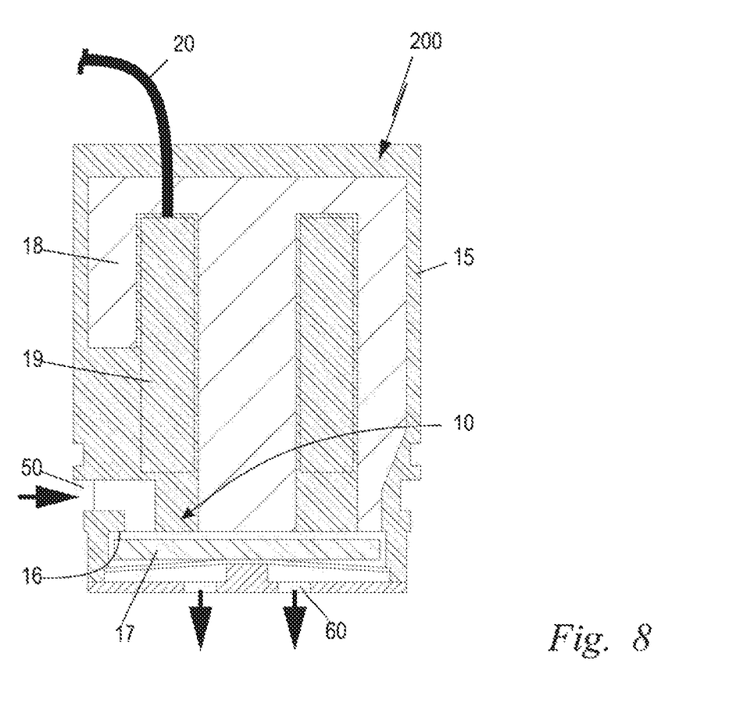

The work apparatus 1 illustrated in FIG. 1 is a cut-off machine 2 with a combustion engine 4 arranged in a housing 3. The combustion engine 4 is supplied with fuel via a fuel system (not illustrated specifically), wherein the metering of the fuel takes place via an electromagnetic valve 10 in the form of a fuel valve 200 (FIG. 8).

The combustion engine drives a work tool 6 in the form of a cutting disk via a drive accommodated in a cantilever 5. The cutting disk is surrounded over a circumferential angle of more than 180° to up to 270° by a protective cover 7. The work apparatus 1 can be carried and guided by a front bale handle 8 and a rear upper handle 9.

A water supply 101 (FIG. 2) is arranged on the work apparatus 1 and includes a water connection 11 which, in the embodiment shown, is provided in the lower region of the bale handle 8. The water connection 11 feeds a water inflow 12 which supplies water to the work tool 6 via inflow nozzles 13. The inflow nozzles 13 are held in the protective cover 7 on both sides of the work tool 6 or the cutting disk (FIG. 2) and are connected to each other via a connecting line 14.

The water connection 11 is provided for connection to a water supply via a water hose which can be connected to the water connection 11 by means of a suitably configured connection coupling. The water hose can be connected to a customary drinking water network. The water pressure expediently lies within the range of between 1 bar and 5 bar.

An electromagnetic valve 10 is arranged between the water connection 11 and the water inflow 12 as a water valve 100 which is accommodated in a valve housing 15.

Figure 3:
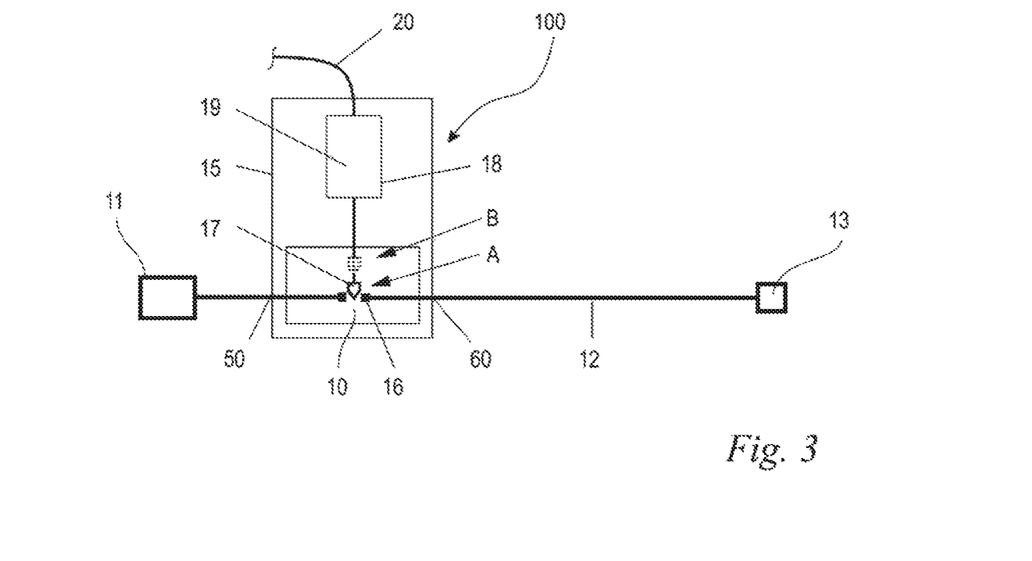
FIG. 3 shows a schematic circuit diagram of the valve-controlled water supply according to FIG. 2 with an electromagnetic valve.

As FIG. 3 shows, the electromagnetic valve 10 includes a valve seat 16 and a valve body 17. The valve body 17 is movable between a first position A and a second position B. In FIG. 3, the first position A is the closed position of the valve 10. The second position B is the open position of the valve 10 and is indicated by the dashed valve body 17. The valve body 17 is mechanically coupled to an electromagnetic drive 18 which has an electric drive coil 19.

Figure 2:
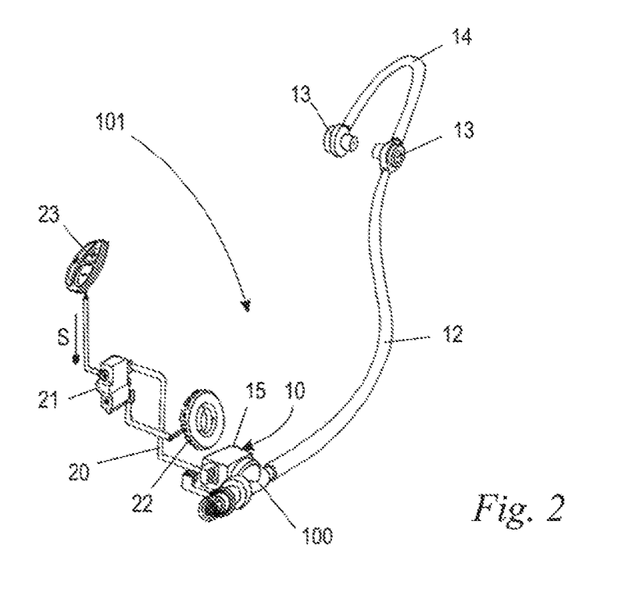
FIG. 2 shows, in a schematic illustration, the configuration of a control unit for a valve-controlled water supply.

As the schematic illustration according to FIG. 2 furthermore shows, the electric drive coil 19 of the electromagnetic drive 18 is connected to a control device 21 via an electric control line 20. The control device 21 is fed with electrical energy by a generator 22. The generator 22 is advantageously the single and sole energy source for the control device 21 and the valve 10. A battery as an energy source supporting the generator 22 is advantageously not provided. It may be advantageous, in particular for the control device, to arrange a buffer store, for example a capacitor, for electrical energy. The control device 21 is connected to a setting unit 23 via which—as indicated by an arrow—a setting variable S is predetermined for the control device 21.

The setting variable S can be, for example, a numerical value between advantageously 1 and 10. According to the value of the setting variable S, the control device 21 outputs a signal sequence 38 (FIG. 4) of control signals 28 to the electric drive coil 19 via the control line 20, bringing about the opening or closing of the electromagnetic valve 10.

If the numerical value of the setting variable S has, for example, the value '5', the signal sequence 38 consisting of control signals 28 is adapted, in particular in a pulse-width-modulated manner, by the control device 21. The switching steps of the numerical value are coordinated in the case of a water valve in such a manner that, at different water pressures, a switching step can always be set in which the quantity of water supplied via the water valve 100 permits optimum dust binding at the cutting disk.

The activation of the electromagnetic valve 10 according to the invention is reproduced by way of example in FIGS. 4 to 7. The depicted control signals 28 form a signal sequence 38. The control signals 28 are configured as operating pulses 30 and as start pulses 40.

The following definitions apply in the description:
A signal sequence 38 is determined by consecutive control signals 28, irrespective of the individual configuration thereof.
Control signals 28 are equally understood as meaning operating pulses 30 and start pulses 40.
A predetermined signal amplitude 25 is the signal amplitude 25, which is predetermined by the control device 21, of the control signal 28 for activating the valve 10 in the operating mode. In the operating mode, the control signal 28 forms an operating pulse 30.
A superelevated signal amplitude 41 is a signal amplitude of a control signal 28 that is greater than the signal amplitude 25, which is predetermined by the control device 21, for operating the valve 10. A control signal 28 with a superelevated signal amplitude 41 forms a start pulse 40.

Figure 4:
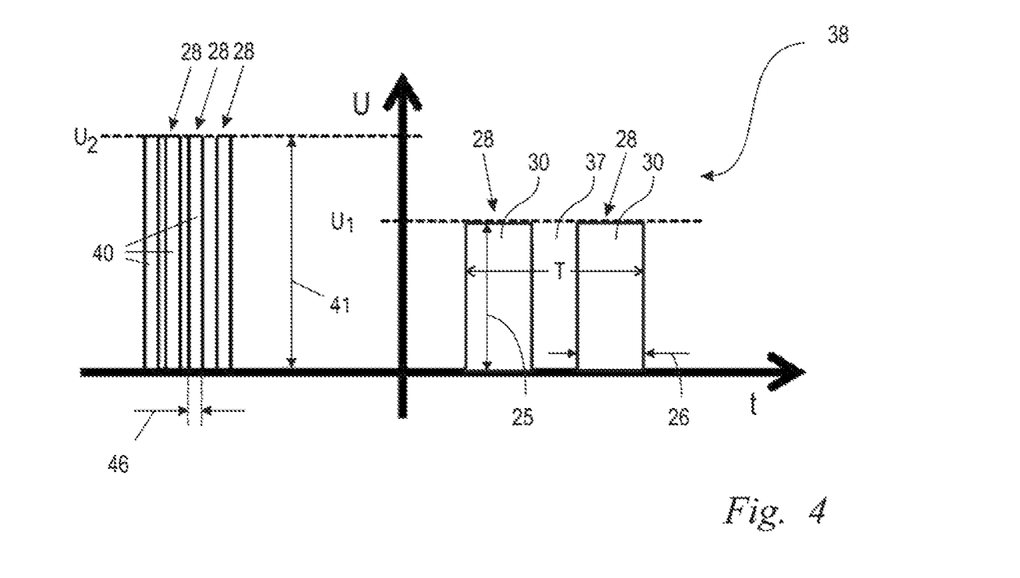
FIG. 4 shows a first embodiment of a signal sequence consisting of control signals for activating the electromagnetic valve.

The operating pulses 30 of the signal sequence 38 that are illustrated on the right side of the diagram in FIG. 4 have a signal amplitude 25 predetermined by the control device 21 and a signal duration 26 predetermined by the control device 21. In particular, the illustrated operating pulses 30 of the signal sequence 38 also have a predetermined frequency.

The operating pulses 30 are output to the drive coil 19 (FIG. 3) by the control device 21 in accordance with a predetermined setting variable S in order to activate the electromagnetic valve 10. The operating pulses 30 determine the opening times 24, which are determined by the control device 21, and closing times 27 during operation of the valve 10.

According to the invention, it is provided to send start pulses 40 to the electric drive coil 19 of the drive 18 prior to the sending of operating pulses 30, as is illustrated, for example, in FIG. 4. The start pulses 40 are intended to bring about an initial movement of a stuck, jammed or sluggish valve body 17.

It is advantageously provided to send the start pulses 40, prior to the operating pulses 30, during each first starting up of the valve 10. The first starting up of the valve 10 is understood as meaning a first starting up of the switched-off valve 10 after a rest period, in particular after a relatively long rest period without operating pulses 30, for example because the valve 10 was deactivated. The first starting up should also be understood as meaning a change in the operating state of the valve 10, in particular if the control device 21 changes the duration of time, the frequency and/or the amplitude of the operating signals 30 in order, for example, to change, namely to increase or reduce, the volumetric flow determined by the valve 10. In particular before each change in the operating pulses 30, at least one start pulse 40 is output to the valve, for example in the event of a change in a desired signal, which is predetermined by the control device 21, for a volumetric flow to be set through the valve 10.

In the embodiment according to FIG. 4, the control device 21 will send out a plurality of start pulses 40, the superelevated signal amplitude 41 of which is greater, in particular more than 30% greater, than the predetermined signal amplitude 25 of the operating pulse 30, before sending out operating pulses 30 of predetermined signal amplitude 25 and predetermined signal duration 26. As in particular FIG. 4 shows, the operating pulse 30 has a voltage $U_1$ with the predetermined signal amplitude 25, while the start pulse 40 has a voltage $U_2$ with a significantly superelevated signal amplitude 41. In particular, the superelevated signal amplitude 41 of the start pulse 40 can be much greater, in particular 1.2 to 3 times greater, than the predetermined signal amplitude 25 of the operating pulse 30. It is advantageously provided to select the voltage $U_2$ of the superelevated signal amplitude 41 of the start pulse 40 to be up to 80% greater than the voltage $U_1$ of the predetermined signal amplitude 25 of the operating pulse 30. The superelevated signal amplitude 41 of the start pulse 40 is advantageously at least 15% to 80% greater than the predetermined signal amplitude 25 of the operating pulse 30. In an advantageous embodiment, the superelevated signal amplitude 41 of the start pulse 40 is 30% to 50% greater than the predetermined signal amplitude 25 of the operating pulse 30.

The sequence of operating pulses 30 has a period duration T. The operating pulses 30 can be changed in signal duration 26 such that signal pauses 37 arise between two operating pulses 30. Such operating pulses 30 of a signal sequence are also referred to as pulse-width-modulated signals. The sequence of the operating pulses 30 with signal pauses 37 formed in between determine the opening times 24 and closing times 27 (FIG. 5) of the electromagnetic valve 10 and therefore the supplied volumetric flow, a supplied quantity of water in the embodiment.

Figure 5:
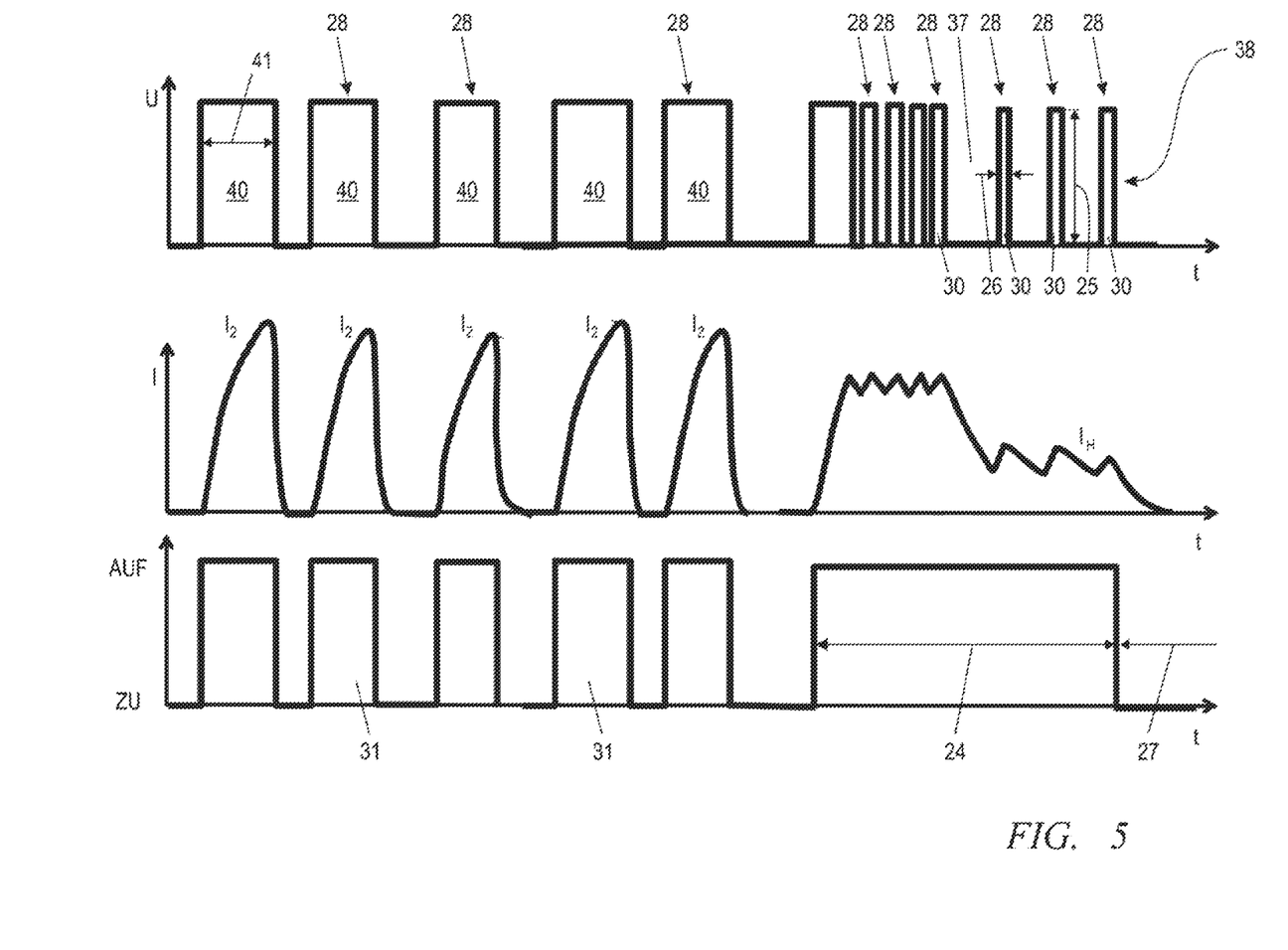
FIG. 5 shows an illustration of a second embodiment of a signal sequence consisting of control signals in the form of start pulses and operating pulses, with an illustration of the current profile in the valve and the position of the valve element.

FIG. 5 illustrates an embodiment of the signal sequence 38, in which, prior to the sending of operating pulses 30, a plurality of, in particular five, start pulses 40 with a 5% to 50% longer signal duration 46 than the predetermined signal duration 26 of a predetermined operating pulse 30 are sent. It is thereby ensured that a possibly stuck or jammed valve body 17 of the valve 10 is initially moved in order then to be moved in accordance with the signal duration 26 of the operating pulses 30 of the signal sequence 38.

The start pulses 40 with a longer signal duration 46 bring about an increased operating current 32 with a current strength $I_2$, as a result of which the valve body 17 is initially moved with an increased setting force. In response, the valve 10 opens and closes repeatedly for short opening times 31. After the start pulses 40, the control device 21 will output operating pulses 30 to the drive coil 19 for the setting of the volumetric flow through the valve 10. The operating pulses 30 are selected in such a manner that the signal pauses 37 become larger after opening of the valve 10 since, when the valve 10 is open, the necessary holding current $I_H$ can become smaller. If operating pulses 30 are stopped, the valve 10 closes.

Figure 6:
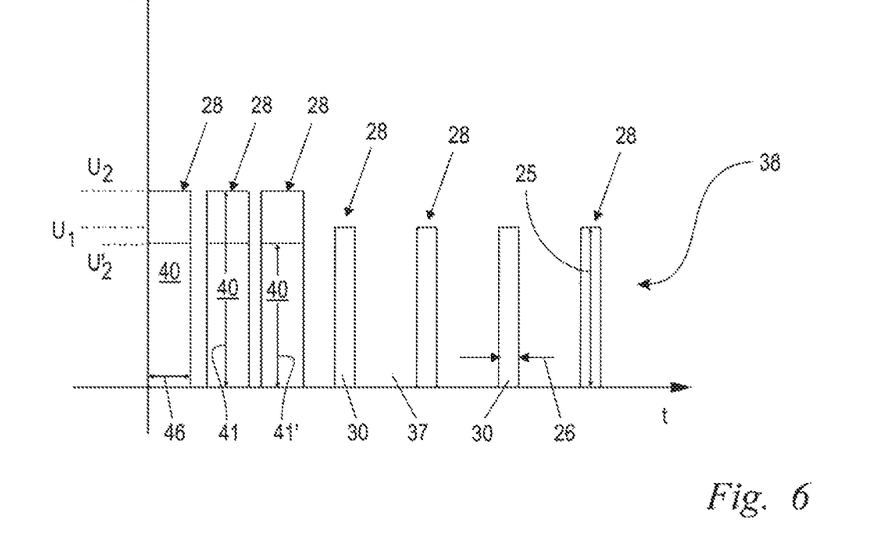
FIG. 6 shows a further embodiment of a signal sequence consisting of control signals for activating the electromagnetic valve.
Figure 7:
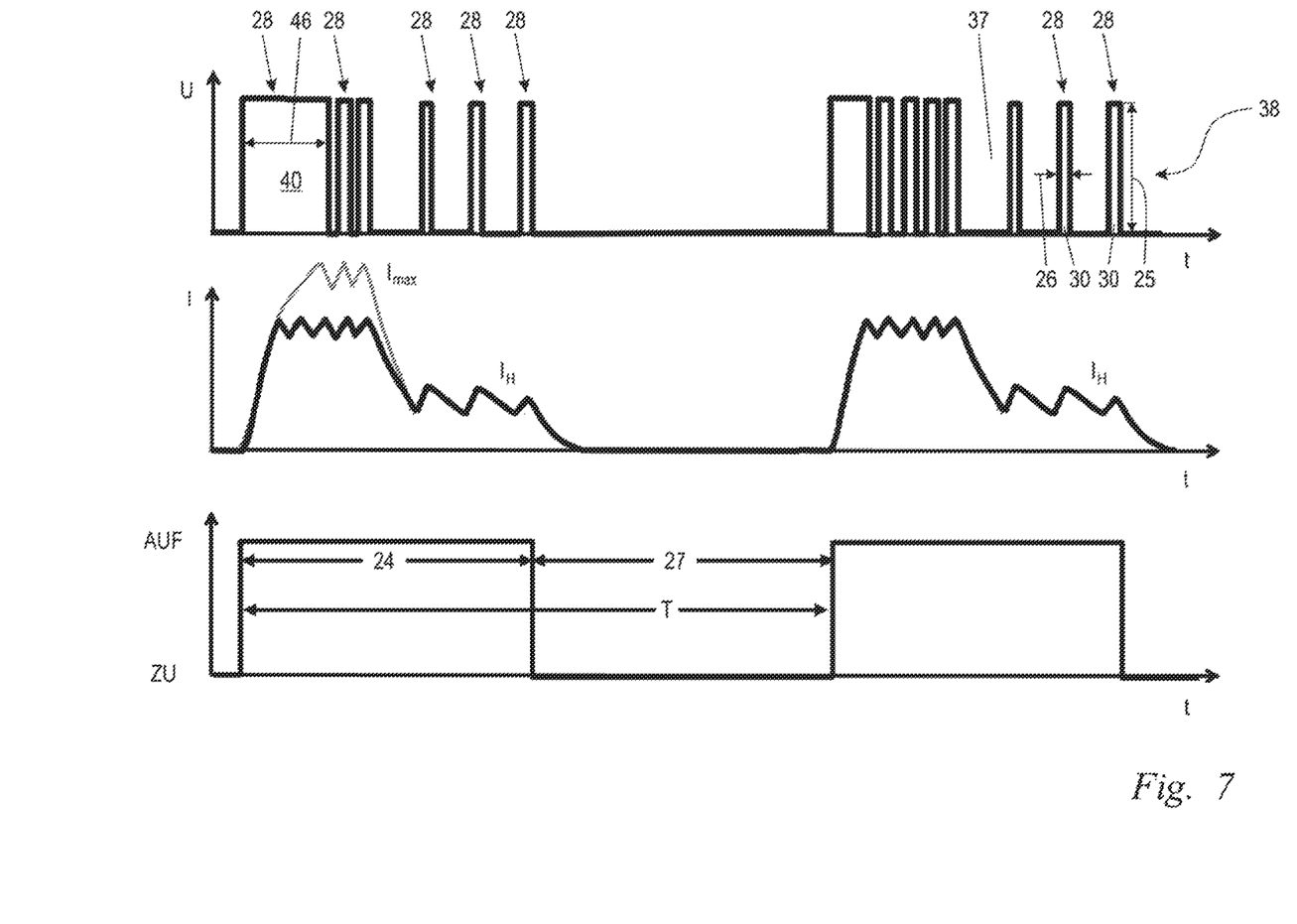
FIG. 7 shows an illustration of a further embodiment of a signal sequence consisting of control signals in the form of start pulses and operating pulses, with an illustration of the current profile in the valve and the position of the valve element; and, FIG. 8 shows a section through an electromagnetic valve as a fuel valve in a fuel system.

The operating pulses 30 for controlling the valve 10 can be preceded by at least one start pulse 40 which forms a first control signal 28 of the signal sequence 38, as shown in FIGS. 6 and 7. The start pulse 40 is directly adjoined by operating pulses 30 for operating the valve. The first control signal 28 which is in the form of a start pulse 40 can have an increased signal amplitude 41 and/or a longer signal duration 46. In FIG. 6, the operating pulses 30 are each preceded by three start pulses 40.

It may also be advantageous, as illustrated in FIG. 7, to configure the signal duration 46 of a first preceding start pulse 40 to be longer than the signal duration 26 of a following operating pulse 30. A start pulse 40 with a longer signal duration 46 expediently precedes a sequence of operating pulses 30 with a signal duration 26.

The start pulse 40 advantageously has a superelevated signal amplitude 41, the voltage $U_2$ of which is greater than the voltage $U_1$ of the predetermined signal amplitude 25 of an operating pulse 30. It may be sufficient to realize the signal amplitude 41' with a voltage $U'_2$ lower than the voltage $U_1$ of the operating pulse. The voltage $U'_2$ is expediently only slightly lower than the voltage $U_1$ of the operating pulse 30. The voltage $U'_2$ is advantageously 10% to 25% lower than the voltage $U_1$ of the operating pulse 30.

FIG. 7 illustrates a signal sequence 38, the first control signal 28 of which is a start pulse 40 and is configured with a longer signal duration 46 than following operating pulses 30.

The start pulse 40 which is configured to be longer in the extended signal duration 46 than the predetermined signal duration 26 of the operating pulses 30 leads to a superelevated current $I_{max}$ in the drive coil 19 of the electromagnetic valve 10 and therefore to an increased electromagnetic setting force on the valve body 17. The increased current $I_{max}$ ensures reliable opening of the valve 10. In a particular embodiment of the invention, the start pulse 40 simultaneously initiates the opening time 24 of the valve 10 which has been put into operation. Operating pulses 30 following the start pulse 40 keep the valve 10 open, which is possible with only a low holding current $I_H$. The operating pulses 30 are modulated in such a manner that, after the valve 10 is opened, the signal pauses 37 become greater, and therefore the holding current $I_H$ which is lower when the valve 10 is open can be kept. If operating pulses 30 stop, the valve 10 closes. A closing time 27 arises until the valve 10 is opened again.

In FIGS. 1 to 3, the electromagnetic valve 10 is provided as a water valve 100 in the water supply 101 of a work apparatus 1 with a work tool 6. The electromagnetic valve 10 has an inflow 50 and an outflow 60 (FIG. 3). The valve seat 16 with a valve body 17 is provided between the inflow 50 and the outflow 60. In the first position A of the valve 10, the valve body 17 blocks the flow connection between the inflow 50 and the outflow 60. In the second position B, the valve body 17 (dashed illustration) opens up the flow connection between the inflow 50 and the outflow 60. In order to meter a sufficient quantity of water to the work tool 6, to the cutting disk in the embodiment, the valve 10 is activated by the control device 21 which opens and closes the electromagnetic valve 10 with a pulse-width-modulated signal sequence 38. The opening times 24 and/or the closing times 27 of the valve 10 are set by the control device 21 as a function of a setting variable S which is predetermined by the user via a setting unit 23. As FIG. 1 shows, the setting unit 23 preferably lies on the left side of the handle 9 and can thus be operated by a user, who is grasping the handle 9 with the right hand, by the user's thumb. In accordance with the setting variable S predetermined by the user, the control device 21 will output a pulse-width-modulated signal sequence 38 of operating pulses 30, as a result of which the volumetric flow through the valve 10 is set. In order to ensure reliable operation of the electromagnetic valve 10, a start pulse 40 is fed in at the beginning of a signal sequence 38 and/or with a first operating pulse 30. The start pulse can have a superelevated signal amplitude 41 which is significantly greater than the predetermined signal amplitude 25 of the operating pulse 30. The superelevated signal amplitude 41 of the start pulse 40 is preferably 30% to 80% higher than the predetermined signal amplitude 25 of the operating pulse 30. As explained above, it can also be expedient to form the start pulse 40 with a signal duration 46 which is extended beyond the predetermined signal duration 26 of the operating pulse 30. It is also advantageous to form start pulses 40 with a higher frequency than the predetermined frequency of the sequence of operating pulses 30.

In particular upon each actuation of the setting unit 23 for the water valve 100, the operating pulses 30 are preceded by at least one start pulse 40, and are advantageously preceded by a plurality of start pulses 40. The start pulses 40 are applied to the drive coil 19 irrespective of operating variables of a drive motor of the work apparatus 1, for example a combustion engine 4. It may be expedient, upon each starting up of the work apparatus 1, to first of all act upon the drive coil 19 of the electromagnetic valve 10 with one or more start pulses 40. The electrical energy necessary for this purpose is provided by the generator 22 as an advantageously sole and single energy source. A battery for electrically supporting the generator 22 is advantageously not provided.

The method according to the invention for activating an electromagnetic valve is advantageously usable not only in conjunction with a water valve 100 in a work apparatus 1.

The method according to the invention is also usable in the case of an electromagnetic valve 10 as a fuel valve 200 (FIG. 8) in a fuel system of a combustion engine 4 of a work apparatus 1. The electromagnetic fuel valve 200 has an inflow 50 and an outflow 60. A valve seat 16 to which a valve body 17 is assigned is provided between the inflow 50 and the outflow 60. In a first position, the flow connection between the inflow 50 and the outflow 60 is blocked; in a second position of the fuel valve 200, the flow connection between the inflow 50 and the outflow 60 is opened up, as is illustrated in FIG. 9. The fuel valve 200 is activated by a control device 21 with a signal sequence 38 which opens and closes the electromagnetic fuel valve 200. The opening times 24 and/or the closing times 27 of the fuel valve 200 are determined via the control device 21 which processes operating variables of the combustion engine 4. This takes place in such a manner that the volumetric flow of fuel flowing through the fuel valve 200 can be set, wherein the electromagnetic fuel valve 200 is acted upon with the signal sequence 38 consisting of operating pulses 30 of predetermined signal amplitude 25, as are shown in FIGS. 4 to 7, in order to move the valve body 17. At the beginning of a signal sequence 38 or with a first operating pulse 30, a start pulse 40 is fed in, the superelevated signal amplitude of which, in a first embodiment, is 30% to 80% greater than the predetermined signal amplitude 25 of the operating pulse 30.

The maximum predetermined signal amplitude 25 of the operating pulse 30 can thus have a voltage $U_1$ which brings about an operating current of advantageously 1.1 ampere in the drive coil 19. The superelevated signal amplitude 41 of the start pulse 40 preferably has a voltage $U_2$ which brings about an increased operating current of advantageously, for example, 1.8 ampere in the drive coil 19. The superelevated signal amplitude 41 of the start pulse 40 is approximately 60% greater than the predetermined signal amplitude 25 of the operating pulse 30.

As explained above, it may also be expedient to form the start pulse 40 with a signal duration 46 which is extended beyond the predetermined signal duration 26 of the operating pulse 30. It is also advantageous to form start pulses 40 with a higher frequency than the predetermined frequency of the sequence of operating pulses 30.

The start pulses 40 are applied to the drive coil 19 irrespective of operating variables of the combustion engine 4, such as load, temperature, rotational speed or the like. In particular, during each first starting up of the work apparatus 1, the drive coil 19 of the electromagnetic fuel valve 200 can be first of all acted upon with one or more start pulses 40.

The various features of the invention have been explained with reference to different embodiments; all of the described and illustrated features can be combined with one another as desired without departing from the scope of the invention.

It is understood that the foregoing description is that of the preferred embodiments of the invention and that various changes and modifications may be made thereto without departing from the spirit and scope of the invention as defined in the appended claims.

What is claimed is:

1. A method for activating an electromagnetic valve, the electromagnetic valve including a valve seat and a valve body; the valve body being in a closed position in a first position (A) and in an open position in a second position (B); the electromagnetic valve further including an electric drive coil for an electromechanical driving of the valve body between the first position (A) and the second position (B); an electric control device connected to the drive coil of the electromagnetic valve, wherein the control device as a function of a setting variable (S) energizes the drive coil with a signal sequence of operating pulses in order to move the valve body between the first position (A) and the second position (B); the control device as a function of the setting variable (S) being configured to determine at least one predetermined signal amplitude for the operating pulses of the signal sequence, a predetermined signal duration for the operating pulses of the signal sequence, and a predetermined frequency for the operating pulses of the signal sequence; the method comprising the step of:

supplying an initial signal sequence including a start pulse and operating pulses to electromechanically drive the valve body for a first activation of the electromagnetic valve, wherein said start pulse is formed with at least one of a signal amplitude superelevated above the predetermined signal amplitude of the operating pulse, a signal duration extended beyond the predetermined signal duration of the operating pulse, and a frequency increased over a predetermined frequency of the operating pulses of the signal sequence, wherein the superelevated amplitude of the start pulse is 30% to 80% greater than the predetermined signal amplitude of the operating pulse.

2. The method of claim 1, wherein the extended signal duration of a start pulse is 5% to 50% longer than the predetermined signal duration of a predetermined operating pulse.

3. The method of claim 2, wherein the extended signal duration of the start pulse is 20% longer than the predetermined signal duration of the predetermined operating pulse.

4. The method of claim 1, wherein the control signals of the initial signal sequence including a start pulse and operating pulses are signals which are modulated in the signal duration.

5. The method of claim 1, wherein the start pulse is a first control signal of the initial signal sequence.

6. The method of claim 1, wherein the electromagnetic valve is a water valve on a cut-off machine.

7. The method of claim 1, wherein the start pulse is supplied to the electric drive coil of the valve body temporally before the operating pulses of the initial signal sequence.

8. The method of claim 1, wherein the electromagnetic valve is an electromagnetic fuel valve in a fuel system of a combustion engine of a work apparatus.

9. A method for activating an electromagnetic valve, the electromagnetic valve including a valve seat and a valve body; the valve body being in a closed position in a first position (A) and in an open position in a second position (B); the electromagnetic valve further including an electric drive coil for an electromechanical driving of the valve body between the first position (A) and the second position (B); an electric control device connected to the drive coil of the electromagnetic valve, wherein the control device as a function of a setting variable (S) energizes the drive coil with a signal sequence of operating pulses in order to move the valve body between the first position (A) and the second position (B); the control device as a function of the setting variable (S) being configured to determine at least one predetermined signal amplitude for the operating pulses of the signal sequence, a predetermined signal duration for the operating pulses of the signal sequence, and a predetermined frequency for the operating pulses of the signal sequence; the method comprising the step of:

supplying an initial signal sequence including a start pulse and operating pulses to electromechanically drive the valve body for a first activation of the electromagnetic valve, wherein said start pulse is formed with at least one of a signal amplitude superelevated above the predetermined signal amplitude of the operating pulse, a signal duration extended beyond the predetermined signal duration of the operating pulse, and a frequency increased over a predetermined frequency of the operating pulses of the signal sequence, wherein the predetermined signal amplitude of the operating pulse has a first predetermined voltage ($U_1$) and the superelevated signal amplitude of the start pulse has a second voltage ($U_2$), the second voltage ($U_2$) being greater than the first voltage ($U_1$).

10. The method of claim 9, wherein the second voltage ($U_2$) is up to 80% greater than the first voltage ($U_1$).

11. The method of claim 9, wherein the electromagnetic valve is a water valve on a cut-off machine.

12. The method of claim 9, wherein the start pulse is supplied to the electric drive coil of the valve body temporally before the operating pulses of the initial signal sequence.

13. The method of claim 9, wherein the electromagnetic valve is an electromagnetic fuel valve in a fuel system of a combustion engine of a work apparatus.

14. A method for activating an electromagnetic valve, the electromagnetic valve including a valve seat and a valve body; the valve body being in a closed position in a first position (A) and in an open position in a second position (B); the electromagnetic valve further including an electric drive coil for an electromechanical driving of the valve body between the first position (A) and the second position (B); an electric control device connected to the drive coil of the electromagnetic valve, wherein the control device as a function of a setting variable (S) energizes the drive coil with a signal sequence of operating pulses in order to move the valve body between the first position (A) and the second position (B); the control device as a function of the setting variable (S) being configured to determine at least one predetermined signal amplitude for the operating pulses of the signal sequence, a predetermined signal duration for the operating pulses of the signal sequence, and a predetermined frequency for the operating pulses of the signal sequence; the method comprising the step of:

supplying an initial signal sequence including a start pulse and operating pulses to electromechanically drive the valve body for a first activation of the electromagnetic valve, wherein said start pulse is formed with at least one of a signal amplitude superelevated above the predetermined signal amplitude of the operating pulse, a signal duration extended beyond the predetermined signal duration of the operating pulse, and a frequency increased over a predetermined frequency of the operating pulses of the signal sequence, wherein the start pulse is a first control signal of the initial signal sequence and a plurality of consecutive start pulses are provided at the beginning of said initial signal sequence.

15. The method of claim 14, wherein up to ten start pulses follow one another.

16. The method of claim 14, wherein the electromagnetic valve is a water valve on a cut-off machine.

17. The method of claim 14, wherein the start pulse is supplied to the electric drive coil of the valve body temporally before the operating pulses of the initial signal sequence.

18. The method of claim 14, wherein the electromagnetic valve is an electromagnetic fuel valve in a fuel system of a combustion engine of a work apparatus.

* * * * *